POWER CONTROL CIRCUIT USING BISTABLE SWITCHING DEVICE

Filed April 13, 1966 2 Sheets-Sheet 1

INVENTOR
ERNEST O. CAIN

BY [signature]
ATTORNEY

INVENTOR
ERNEST O. CAIN

BY [signature]

ATTORNEY

United States Patent Office 3,484,623
Patented Dec. 16, 1969

3,484,623

POWER CONTROL CIRCUIT USING BISTABLE SWITCHING DEVICE

Ernest O. Cain, Dallas, Tex., assignor to Hunt Electronics Company, Dallas, Tex., a corporation of Texas Filed Apr. 13, 1966, Ser. No. 542,258
Int. Cl. H03k *17/00, 1/12*
U.S. Cl. 307—252 8 Claims

ABSTRACT OF THE DISCLOSURE

A circuit for controlling electric discharge lamps or other inductive loads from an alternating current supply voltage in which a gated bilateral AC switch is connected in series with the load in the AC supply voltage. A second bilaterial AC switch is connected for applying to the first switching device a control signal when the second switching device is switched below impedience state. A branch circuit is connected in shunt with the second switching device for applying a control signal to the second switching device. The second switching device is connected in shunt with the load such that the characteristics of the load will not adversely affect switching of the second switching device.

The present invention relates to circuits for controlling the effective power applied to a load from a source of alternating current supply voltage by controlling the duration of flow of current during at least one-half cycle and more particularly to such a power control especially adapted for use with inductive loads.

It is well known to control the power applied to a load from a source of alternating current supply voltage by controlling the conduction time of a switching device connected in series with the load to permit the current to flow to the load only during selected portions of half cycles of power. Thus, thyratron type vacuum tubes, silicon controlled rectifiers and various types of diode devices exhibiting similar switching characteristics have been used for controlling the power applied to many diverse loads, such as, for example, lights, motors and welding equipment.

The advent of semiconductor switching devices such as the silicon controlled rectifier, the four and five layer diodes and bi-directional semiconductor switches have greatly increased the utilization of such circuits. However, each of the semiconductor devices are commonly characterized in that before the devices will remain in the low impedance state upon application of a control signal thereto, a minimal amount of holding current must flow. Upon cessation of the flow of holding current, the device will return to its normally high impedance state. This is true without regard to the cause for cessation of flow of holding current. Thus, at the end of a half cycle of alternating current supply voltage, such devices will return to the high impedance state. Also, if at the end of the application of the control signal a minimum amount of holding current has not commenced to flow, as when the device is connected to a highly inductive load, the device will return to the high impedance state. Exemplary of such highly inductive loads would be certain motors and the ballast associated with fluoroescent lamps.

The present invention provides a power control system especially adapted for use with a dimming ballast of fluorescent lamps for controlling the effective power applied to fluorescent lamps to thereby control the intensity of light emitted thereby. The power control circuit of the present invention can, however, also advantageously be utilized with other types of inductive loads.

In accordance with the principles of the present invention, there is provided first and second switching devices. Each of the switching devices has two electrodes and is characterized by normally exhibiting a high impedance to the flow of current between the two electrodes. However, upon application of a control signal to the device, the device will switch to a quasi stable low impedance state and remain in the quasi stable low impedance state so long as holding current flows through the two electrodes. In accordance with the preferred embodiment of the invention, the switching devices are each three leaded devices in which the control signal is supplied through the gate electrode. The preferred type of switching device is a bilateral AC switch, suitably of the type disclosed in an article entitled, "Bi-Directional Triode P-N-P-N Switches" by F. E. Gentry, R. I. Scase and J. K. Flowers, published in vol. 53, page 355 of the April 1965 issue of the Proceedings of the IEEE. However, parallel connected silicon controlled rectifiers can be utilized.

There is also provided means for connecting the first switching device by its two electrodes in series with the load and a source of alternating current supply voltage whereby the conductive period of the first switching device controls the effective power applied to the load. The second switching device is connected for applying to the first switching device a control signal responsive to the second switching device being switched to the low impedance state. There is also provided a branch circuit connected in shunt with the second switching device for generating and applying to the second switching device a control signal during at least one and preferably both of each half cycles of applied alternating current supply voltage. The second switching device is not connected in series with the load, but rather in shunt therewith. The characteristics of the load will therefore not adversely affect switching of the second switching device to its low impedance state. The second switching device will therefore be switched to its quasi stable low impedance state immediately upon a control signal being applied thereto and remain in the low impedance state until the end of the half cycle of alternating current supply voltage in which it is switched to the low impedance state. Immediately upon the second switching device being switched to the low impedance state, a control signal will be applied to the first device, which control signal will continuously be applied to the first device until the end of a half cycle af alternating current supply voltage. Assurance is therefore provided that the control signal will be maintained until the holding current through the first device attains a level sufficient to hold the device in the low impedance state. As a control signal is continuously applied to the first switching device when the second switching device is in the low impedance state and the condition of the second device is not substantially affected by conditions in the load circuit, a control signal will always be available to return the first device to the low impedance state if the first device should be turned off due to ringing or transients in the load circuit.

Many objects and advantages of the invention will become apparent to those skilled in the art as the following detailed description of the preferred embodiment of the invention unfolds when taken in conjunction with the appended drawings wherein like reference numerals denote like parts and in which.

Figure 1:
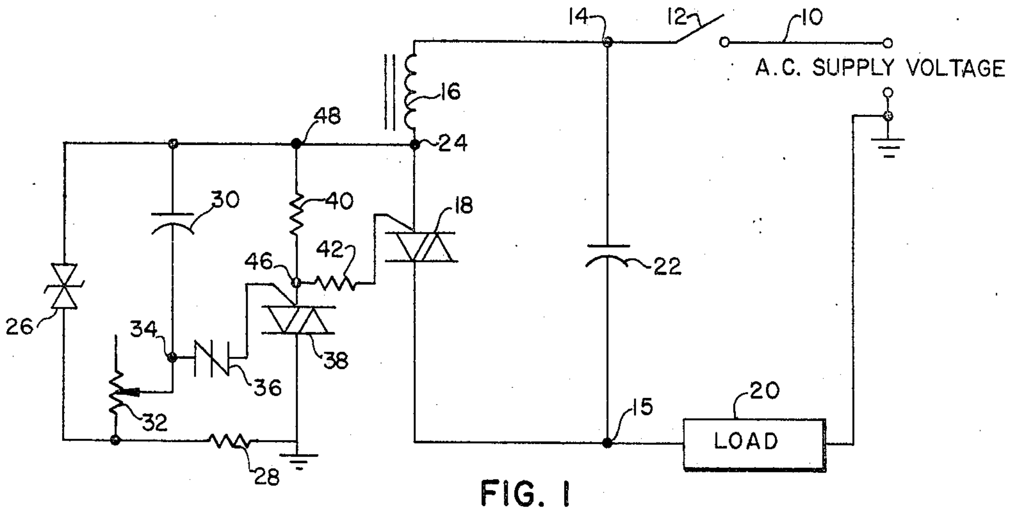
FIGURE 1 is a schematic diagram illustrating a power control circuit in accordance with a preferred embodiment of the present invention.

Turning now to FIGURE 1 of the drawings, there is shown a source of alternating current supply voltage having one side connected to common, denoted schematically as being ground, and the other side connected through line 10 to one side of switch 12. The other side of switch 12 is connected to juncture point 14. Juncture point 14 is connected through an inductor 16 and a switching device 18 to juncture point 15 which is connected to one side of load 20. The other side of load 20 is connected to ground. Capacitor 22 is connected between juncture point 14 and juncture point 15. The juncture between inductor 16 and device 18, denoted by reference character 24, is connected through a branch circuit comprising a double base Zener diode 26 and resistor 28 to ground. The branch circuit also includes a capacitor 30 and a variable resistor 32 connected in series across the double base Zener diode 26. The juncture 34 between resistor 32 and capacitor 30 is connected through a symmetrical diode switching device 36 to the gate electrode of a switching device 38. The juncture 24 is also connected through resistor 40 and two terminals of the device 38 to ground with the juncture 46 between resistor 40 and device 38 being connected through resistor 42 to the gate electrode of device 18.

In operation of the circuit shown in FIGURE 1, when switch 12 is closed, the voltage appearing across the double base Zener diode 26 will be substantially an alternating square wave signal. The voltage appearing across the double base Zener diode 26 is applied to charge capacitor 30 through resistor 32. At such time as the voltage on capacitor 30 becomes equal to the break-over voltage of switching device 36, switching device 36, which is suitably either a three or five layer diode device, will switch to its low impedance state permitting discharge of the capacitor 30 through device 36 to apply a control signal to the device 38 to cause device 38 to switch from its normally high impedance state to its low impedance state. The inductance of inductor 16 is not sufficiently large to interfere with the switching of device 38, and device 38 will immediately switch to the low impedance state and remain in the low impedance state until the end of the half cycle at which time the voltage across the device will become insufficient to maintain the necessary holding current flow.

As a result of the flow of current through device 38, a potential will be developed across resistor 40 to cause the flow of current through a current limiting resistor 42 to the gate electrode of device 18. Thus, immediately upon the device 38 switching to its low impedance state, a control signal will be applied to device 18 until device 38 returns to its high impedance state at the end of a half cycle of alternating current supply voltage. Immediately upon the application of a control signal to the device 18, device 18 will switch to its low impedance state and be maintained in its low impedance state by the control signal applied through resistor 42 without regard to the amount of current flowing through the device. It will be noted that since the device 38 and the branch circuit are each connected in shunt with both the device 18 and the load 20, the switching of device 18 to the low impedance state will not cause removal of the control signal from device 18. Similarly, switching of device 38 to its low impedance state will not move the voltage from across the branch circuit which produces a control signal applied to device 38. However, it is practical, by connecting resistor 28 between juncture points 48 and 24, to prevent substantial charging of capacitor 30 during a period of time that device 38 is in its low impedance state.

When the device 18 switches to its low impedance state, current will commence to flow through load 20. The capacitor 22 and inductor 16 cooperate to provide a filtering effect to minimize transients and high frequency interference generated as a result of rapid switching of device 18 from its high impedance state to its low impedance state. In this connection, it will be noted that the wave form of the signal produced by the rapid switching of device 18 will contain a substantial quantity of very high frequency components. Again, it is important to note that since the control signal is continuously applied to device 18 from the time that the device 38 switches to its low impedance state until the end of the half cycle that the presence of the control signal will maintain the device 18 on for a sufficient time to permit the build up of current through load 20 even through a relatively long period of time is required. Further, in the event inductive surges should develop to cause device 18 to momentarily be switched off or return to its high impedance state, it will immediately thereafter return to the low impedance state due to the presence of a control signal.

It will be appreciated that in the practice of the invention the device connected in series with the load must be a device of a character such that it is possible to continuously apply a control signal to the device for substantial periods of time. Exemplary of such devices are the gated device shown or a photosensitive device. On the other hand, the device 38 could be a diode device to which a momentary control signal would be applied through a coupling transformer, rather than being a gated device as shown.

Figure 2:
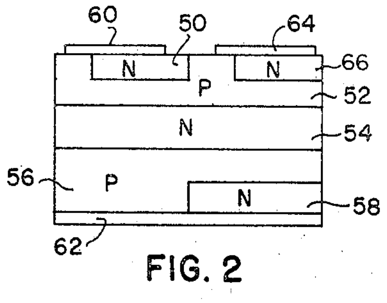
FIGURE 2 is a view in cross section of a preferred type of semiconductor device for use in practicing the present invention.
Figure 3:
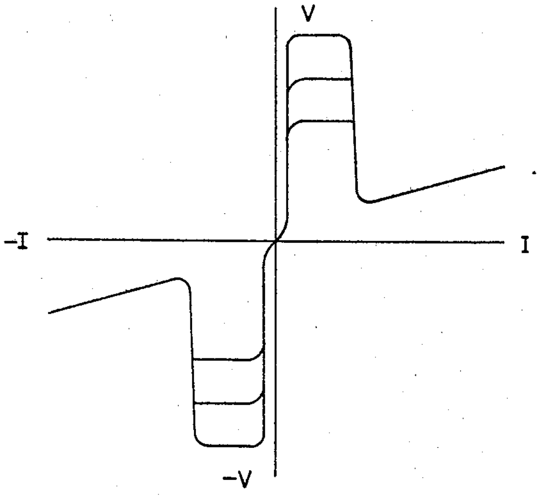
FIGURE 3 is a curve illustrating the voltage current characteristics of the device of FIGURE 2.

The preferred type of device is shown in cross section in FIGURE 2 of the drawings and can be seen to comprise five layers 50, 52, 54, 56 and 58, contiguous layers being of opposite type conductivity. An electrical contact 60 is made to the layers 50 and 52 and a second electrical contact 62 extends across layers 56 and 58. Power flows between electrical contacts 60 and 62. There is also provided an electrical contact 64 that contacts a gate region 66 and a portion of layer 52. Electrical contact 64 functions as a gate electrode. The semiconductive device shown in FIGURE 2 exhibits blocking current and voltage characteristics similar to that of a silicon controlled rectifier, but can switch a load current of either polarity as shown in FIGURE 3. The voltage that must be impressed across contacts 60 and 62 for the device to switch to the low impedance state is a function of the gate current flowing and can be very low. By controlling the time relationship between the beginning of a half cycle of alternating current supply voltage and the time at which the control signal, i.e. gate current, is applied to the device, control of effective power applied to a load can be obtained.

Figure 4:
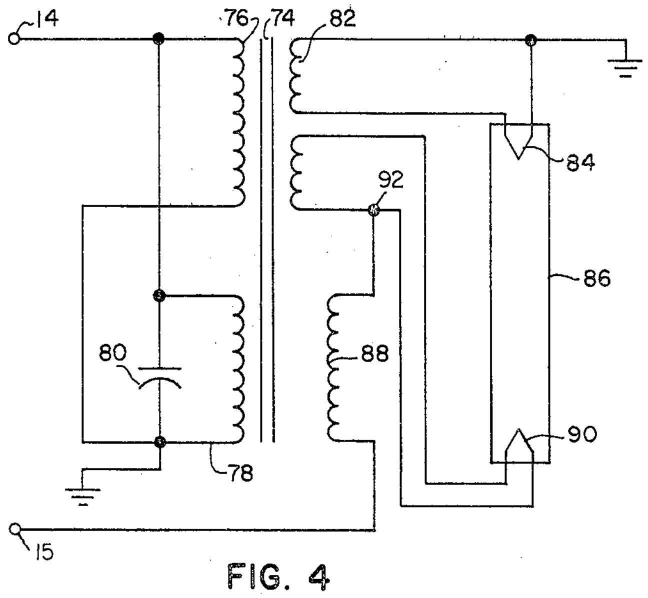
FIGURE 4 is a schematic diagram of a typical dimming ballast for use with fluorescent lamps showing the manner in which such a dimming ballast could be connected with the power control circuit of FIGURE 1.

As mentioned previously, the power control of the present invention is especially adapted for control of the effective power applied to a fluorescent lamp to thereby control the intensity of light emitted by the lamp. A typical fluorescent ballast suitable for dimming is shown in FIGURE 4 of the drawings and can be seen to comprise a transformer 74 having primary windings 76 and 78 connected in parallel. A capacitor 80 is suitably connected across each of the primary windings 76 and 78. When used in combination with the power control of the present invention, one side of each of the primary windings 76 and 78 is suitably connected to a juncture point 14 of the circuit of FIGURE 1, the other side of each of the two windings being connected to ground. The ballast transformer 74 also includes a filament winding 82 which is connected to one filament 84 of neon tube 86. Filament 84 is connected to ground. There is also included a second secondary winding 88 which is connected at one end to one side of the second filament 90, its other end being suitably connected to juncture point 15 of the power control circuit of FIGURE 1. Tap 92 on winding 88 is connected to the other side of filament 90.

It can be seen that when switch 12 is closed, current will flow through primary winding 76 and 78 to cause voltages to be applied to filaments 84 and 90, maintaining the fluorescent tube 86 in condition for starting. The potential existing between filaments 84 and 90 will not, however, be sufficient to produce ionization of the tube 86. However, when switching device 18 switches to its low impedance state responsive to a control signal being applied thereto, current will flow through winding 88, causing tube 86 to be ionized. It will be noted that winding 88 has many turns in order to produce the high voltage necessary for ionization of the tube 86 and, accordingly, is characterized by a very high inductance. The time required for current flowing through device 18 becomes sufficient to hold the device in the low impedance state substantial. However, since gate current is applied to the device 18 from the time that the device 38 switches to the low impedance state until the time that it returns to the high impedance state at or near the end of the half cycle of applied supply voltage, assurance is provided that a control signal will be available to maintain the device 18 in the low impedance state until sufficient holding current flows.

Figure 5:
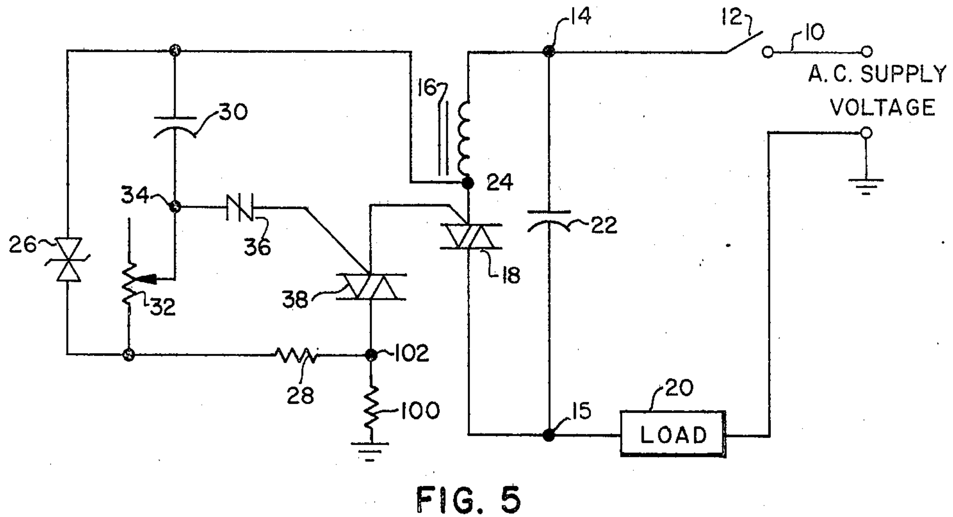
FIGURE 5 is a schematic diagram illustrating a power control circuit in accordance with a second preferred embodiment of the present invention.

Turning now to FIGURE 5 of the drawings, the second embodiment of a power control circuit in accordance with the principles of the present invention is illustrated. It will be readily apparent that the circuit of FIGURE 5 is substantially the same as the circuit of FIGURE 1, the difference being that resistor 28 is connected to ground through a resistor 100 with the juncture 102 between resistor 28 and resistor 100 being connected to one of the power electrodes of device 38 and the other power electrode of device 38 being connected directly to the gate electrode of device 18.

The operation of the circuit of FIGURE 5 is as follows. At the closure of switch 12, a potential will be applied to the series circuit comprising capacitor 30 and resistor 32 which is limited to the Zener voltage of the Zener diode device 26. At such time as capacitor 30 is charged to the breakover voltage of device 36, a control signal will be applied to device 38, causing it to switch to the low impedance state. When device 38 switches to its low impedance state, it will receive holding current from juncture point 24 through the gate electrode of device 18 and through resistor 100 to ground. It will be noted that resistor 100 is of an appropriate size to permit the necessary holding current to flow but yet limit the gate current flowing through device 18 to a level such that device 18 will not be damaged. Gate current will therefore be applied to device 18 and holding current for device 38 provided until the end of the half cycle of alternating current supply voltage.

It will be noted that the device 38 is connected in shunt with load 20 and therefore the characteristics of load 20 will not affect switching of device 38 nor the application of a control signal to device 18. Zener diode 26 is, however, connected in shunt with device 38, and the maximum voltage that will be applied to charge capacitor 30 will be the voltage appearing between juncture point 24 and juncture point 102. At such time as device 38 switches to its low impedance state, the potential appearing between juncture point 24 and juncture point 102 will drop to a relatively low level, suitably in the order of 3 to 5 volts depending upon the forward voltage drop of the device 38 and the voltage drop appearing between the gate electrode of device 18 and the electrode connected to juncture point 24. Thus, once device 38 switches to the low impedance state the capacitor 30 will not thereafter be charged to a sufficient voltage to affect the conductivity state of device 36.

The embodiment of the invention as shown in FIGURE 5 of the drawings is preferred to that shown in FIGURE 1 of the drawings in that gate current can be applied to device 18 only when device 38 is in its low impedance state. It will be noted that in the circuit of FIGURE 1 some gate current can flow to device 18 through a path comprising resistor 28, resistor 32, capacitor 30, resistors 40 and 42. In some instances, as when device 18 is very sensitive to gate current, a small amount of gate current flowing through this path can cause difficulties in operation of the circuit. It will also be noted that either the circuit of FIGURE 1 or the circuit of FIGURE 5 can utilize other means such as, for example, the well known unijunction circuits for generation and application of a control signal to the switching device 38.

Although the invention has been described with reference to a particular preferred embodiment thereof, many changes and modifications will be obvious to those skilled in the art in view of the foregoing description. Thus, devices and arrangements of devices other than those shown can be utilized to obtain similar results and means other than the specific phase shift and pulse forming networks and specific devices shown may be utilized in equivalent arrangements. The invention is therefore to be limited not to what has been shown herein but only as necessitated by the scope of the appended claims.

What I claim is:

1. A power control circuit for controlling the power applied to a load from a source of alternating current supply voltage comprising:

(a) first and second switching devices each having a gate electrode and two power electrodes, said devices normally exhibiting a high impedance between said two power electrodes but being switched to a quasi stable low impedance state when a control signal is applied thereto and thereafter remaining in the quasi stable low impedance state so long as holding current flows through said two electrodes;

(b) means for connecting said first switching device by said two power electrodes in series with a load and a source of alternating current supply voltage;

(c) a branch circuit connected for generating and applying to said second switching device a control signal during at least a portion of one-half cycle of each cycle of applied alternating current supply voltage to cause said second switching device to switch to the low impedance state;

(d) means connecting said second switching device for applying to the gate electrode of said first switching device a control signal to cause said first switching device to switch to the low impedance state responsive to said second switching device being switched to the low impedance state;

(e) said branch circuit including a capacitor and a resistor connected in shunt with said second switching device and diode switching means normally exhibiting a high impedance between its two electrodes but being switched to the low impedance state responsive to the voltage thereacross attaining a predetermined level connected to apply a control signal to the gate electrode of said second switching device responsive to the charge on said capacitor attaining said predetermined level.

2. A power control circuit as defined in claim 1 wherein said second switching device is connected in shunt with said load whereby the character of the load does not substantially affect the flow of holding current through said second switching device.

3. A power control circuit as defined in claim 2 wherein one of said two electrodes of said second switching device is connected to said gate electrode of said first switching device.

4. A power control circuit as defined in claim 1 wherein said first switching device is a bi-directional AC switch.

5. A power control circuit as defined in claim 1 wherein said first and second switching devices are each bi-directional AC switches.

6. A power control circuit as defined in claim 3 further including a resistor connected in circuit with said second switching device and the gate electrode of said first switching device for limiting the current flowing through said gate electrode.

7. A power control as defined in claim 1 further including a voltage limiting means connected across said resistor and capacitor.

8. A power control circuit as defined in claim 1 including circuit means for continuously applying holding current to said second switching device from the time in a half cycle that said second switching device is switched to the low impedance state until substantially the end of said half cycle whereby a control signal is continuously applied to said first switching device from the time that said second switching device is switched to the low impedance state until near the end of the half cycle.

References Cited

UNITED STATES PATENTS

| | | | |
|---|---|---|---|
| 3,189,747 | 6/1965 | Hoff | 307—252 |
| 3,225,280 | 12/1965 | Happe et al. | 307—252 |
| 3,249,807 | 5/1966 | Nuckolls | 307—305 |
| 3,344,311 | 9/1967 | Nuckolls | 307—252 |
| 3,348,128 | 10/1967 | Storm | 307—284 |
| 3,360,713 | 12/1967 | Howell | 307—252 |
| 3,381,226 | 4/1968 | Jones et al. | 307—252 |
| 3,414,768 | 12/1968 | Peck | 307—299 X |

JOHN S. HEYMAN, Primary Examiner

J. D. FREWS, Assistant Examiner

U.S. Cl. X.R.

307—262, 305